US011558804B2

(12) United States Patent
Ishizu

(10) Patent No.: US 11,558,804 B2
(45) Date of Patent: Jan. 17, 2023

(54) COMMUNICATION APPARATUS CAPABLE OF WIRELESS COMMUNICATION WITH EXTERNAL APPARATUS, CONTROL METHOD THEREFOR, AND STORAGE MEDIUM STORING PROGRAM FOR EXECUTING CONTROL METHOD

(71) Applicant: CANON KABUSHIKI KAISHA, Tokyo (JP)

(72) Inventor: Akihiko Ishizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/220,463

(22) Filed: Apr. 1, 2021

(65) Prior Publication Data

US 2021/0314847 A1 Oct. 7, 2021

(30) Foreign Application Priority Data

Apr. 6, 2020 (JP) .............................. JP2020-068606

(51) Int. Cl.
*H04W 40/36* (2009.01)
*H04W 40/24* (2009.01)
(Continued)

(52) U.S. Cl.
CPC ........... *H04W 40/36* (2013.01); *H04W 36/03* (2018.08); *H04W 36/12* (2013.01); *H04W 40/24* (2013.01)

(58) Field of Classification Search
CPC ..... H04W 36/03; H04W 36/12; H04W 40/24; H04W 40/36; H04W 84/12; H04W 88/06;
(Continued)

(56) References Cited

U.S. PATENT DOCUMENTS 7,966,016 B2 * 6/2011 Moritomo ............. H04L 63/123
370/254
8,937,667 B2 * 1/2015 Okazaki ............. H04N 5/23216
348/211.8
(Continued)

FOREIGN PATENT DOCUMENTS

JP 2011-151745 A 8/2011

*Primary Examiner* — Nathan S Taylor
(74) *Attorney, Agent, or Firm* — Canon U.S.A., Inc. IP Division

(57) ABSTRACT

A communication apparatus is provided that establishes a wireless LAN communication by handover. The communication apparatus communicates with an external apparatus through a first communication path. The communication apparatus includes a storage unit that store a communication parameter used for communicating with the external apparatus through a second communication path, a communication establishment control unit that performs control to establish communication with the external apparatus through the second communication path using the communication parameter stored, and a communication parameter change control unit that performs control to change the communication parameter stored in the external apparatus that establishes communication through the second communication path. The communication parameter change control unit prohibits change of the communication parameter stored in the external apparatus that establishes communication through the second communication path when the communication through the second communication path is established by switching from communication through the first communication path.

10 Claims, 9 Drawing Sheets

(51) Int. Cl.
*H04W 36/00* (2009.01)
*H04W 36/12* (2009.01)

(58) Field of Classification Search
CPC ....... H04W 4/80; H04W 76/14; H04W 36/00;
H04W 12/08; H04W 48/20; H04W 76/10;
H04W 76/20; H04W 88/02; H04L 12/12
See application file for complete search history.

(56) References Cited

U.S. PATENT DOCUMENTS

| | | | |
|---|---|---|---|
| 9,060,082 B2* | 6/2015 | Watanabe | H04N 1/00281 |
| 2013/0107062 A1* | 5/2013 | Okazaki | H04N 5/232933 |
| | | | 348/207.1 |
| 2014/0085675 A1* | 3/2014 | Watanabe | H04N 1/00233 |
| | | | 358/1.15 |
| 2014/0118778 A1* | 5/2014 | Lee | H04W 76/11 |
| | | | 358/1.15 |
| 2014/0184830 A1* | 7/2014 | Eom | H04B 5/00 |
| | | | 348/207.11 |
| 2015/0049206 A1* | 2/2015 | Eshita | H04N 5/23209 |
| | | | 348/207.11 |
| 2016/0029151 A1* | 1/2016 | Hara | H04W 40/244 |
| | | | 455/41.1 |
| 2016/0227097 A1* | 8/2016 | Tanaka | H04W 48/18 |
| 2017/0064063 A1* | 3/2017 | Watanabe | H04B 5/0031 |
| 2017/0212566 A1* | 7/2017 | Kaechi | H04W 4/80 |

* cited by examiner

COMMUNICATION APPARATUS CAPABLE OF WIRELESS COMMUNICATION WITH EXTERNAL APPARATUS, CONTROL METHOD THEREFOR, AND STORAGE MEDIUM STORING PROGRAM FOR EXECUTING CONTROL METHOD

BACKGROUND

Field

The present disclosure relates to a communication apparatus that is capable of wireless communication with an external apparatus, a control method therefor, and a storage medium storing a control program for executing the control method.

Description of the Related Art

There is known a mobile terminal that acts as a communication apparatus that communicates with an external apparatus like a digital camera through a wireless LAN (Local Area Network). When a user applies a predetermined operation to a digital camera to establish a wireless LAN communication and inputs communication parameters of the digital camera used for the wireless LAN communication to the mobile terminal, the mobile terminal enables wireless LAN communication with the digital camera. Moreover, handover is used as another method to establish the wireless LAN communication. When using the handover, the mobile terminal obtains the communication parameters of the digital camera from the digital camera by a near-field wireless communication and switches from the near-field wireless communication to the wireless LAN communication by using the obtained communication parameters of the digital camera (for example, as discussed in Japanese Laid-Open Patent Publication (Kokai) No. 2011-151745 (JP 2011-151745A)). The mobile terminal can thereby enable a wireless LAN communication with the digital camera without applying a predetermined user operation to the digital camera and without inputting communication parameters to the mobile terminal. The mobile terminal can store the communication parameters of the digital camera obtained from the digital camera by the near-field wireless communication. Then, the next time the mobile terminal needs to establish a wireless LAN communication with the digital camera by handover, the mobile terminal can use the stored communication parameters of the digital camera to establish the wireless LAN communication.

When the mobile terminal establishes a wireless LAN communication with the digital camera, a user is able to input various instructions to the digital camera by operating the mobile terminal. For example, the user is able to instruct the digital camera to change the communication parameters stored in the digital camera to other values by operating the mobile terminal.

However, when the user instructs the digital camera to change the communication parameters by operating the mobile terminal, although the communication parameters of the digital camera are changed to other values, in a conventional system, the communication parameters stored by the mobile terminal are not changed. This result causes an inconsistency between the communication parameters stored by the mobile terminal and the communication parameters stored in the digital camera, which can cause a failure in establishing a wireless LAN communication by the handover process the next time that the mobile terminal attempts to use handover to establish wireless communication.

SUMMARY

Various embodiments of the present disclosure provide a communication apparatus that can establish a wireless LAN communication by handover and addresses certain problems that can sometimes occur in a handover process, a control method for the communication apparatus, and a storage medium storing a program for executing the control method.

Accordingly, a first embodiment of the present disclosure provides a communication apparatus that communicates with an external apparatus through a first communication path. The communication apparatus includes a storage unit configured to store at least one communication parameter used for communicating with the external apparatus through a second communication path different from the first communication path, a communication establishment control unit configured to perform control to establish communication with the external apparatus through the second communication path using the at least one communication parameter stored in the storage unit, and a communication parameter change control unit configured to perform control to change the at least one communication parameter stored in the external apparatus that established communication through the second communication path. The communication parameter change control unit prohibits change of the at least one communication parameter stored in the external apparatus that establishes communication through the second communication path in a case where the communication through the second communication path is established by switching from communication through the first communication path.

Accordingly, a second embodiment of the present disclosure provides a control method for a communication apparatus that communicates with an external apparatus through a first communication path and a second communication path that is different from the first communication path and that is provided with a storage unit that stores at least one communication parameter for communicating with the external apparatus through the second communication path. The control method includes a communication establishment control step of controlling to establish communication with the external apparatus through the second communication path using the at least one communication parameter stored in the storage unit, and a communication parameter change control step of controlling change of the at least one communication parameter stored in the external apparatus that established communication through the second communication path. Change of the at least one communication parameter stored in the external apparatus that establishes communication through the second communication path is prohibited in the communication parameter change control step in a case where the communication through the second communication path is established by switching from communication through the first communication path.

Accordingly, a third embodiment of the present disclosure provides a non-transitory computer-readable storage medium storing a control program causing a computer to execute the control method of the second aspect.

According to various embodiments of the present disclosure, a situation where a wireless LAN communication cannot be established by the handover because of an inconsistency in parameters is avoided.

Further features will become apparent from the following description of exemplary embodiments with reference to the attached drawings.

DESCRIPTION OF THE EMBODIMENTS

Figure 1:
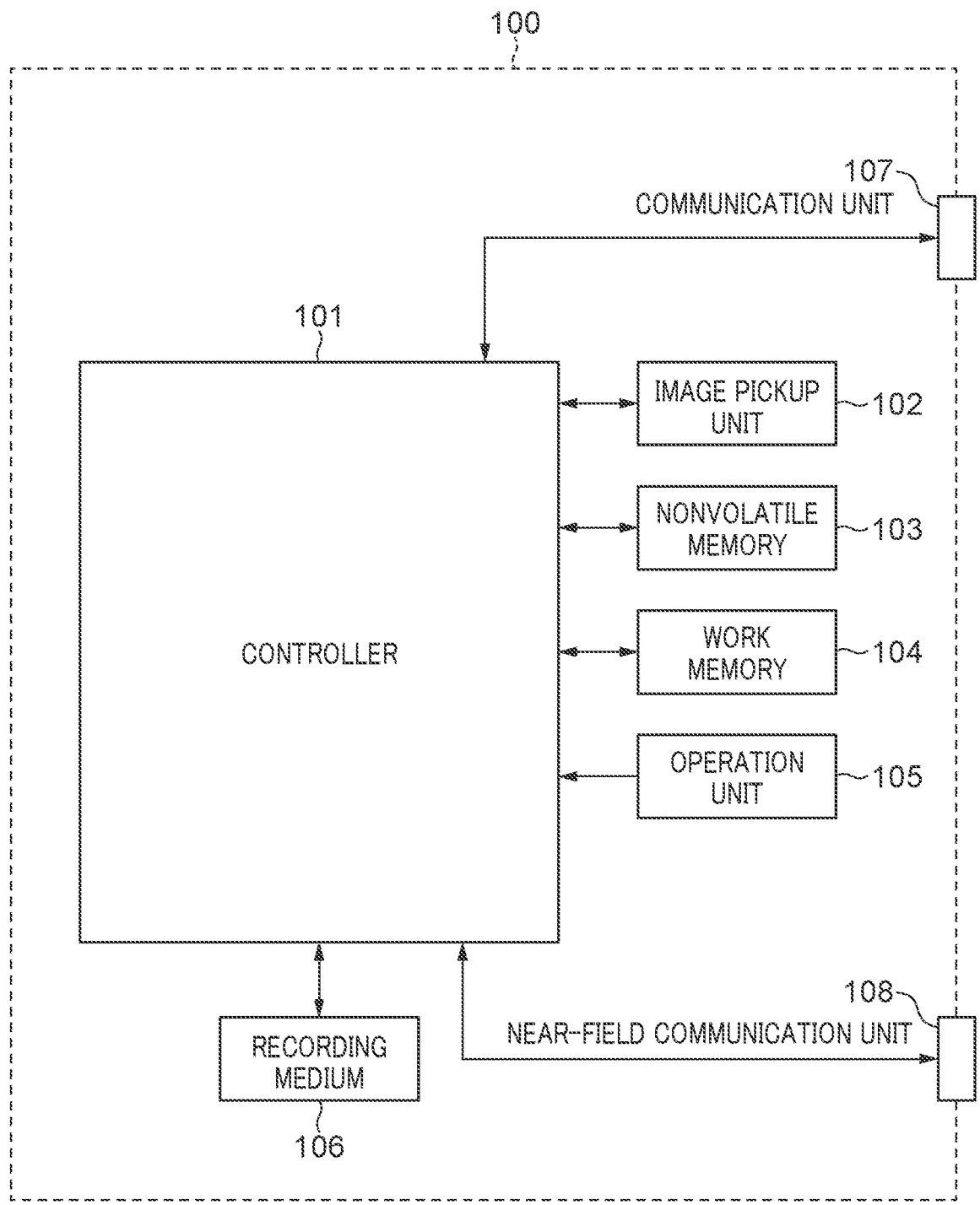
FIG. 1 is a block diagram schematically showing a configuration of a digital camera as an external apparatus that communicates with a communication apparatus according to one embodiment.

Hereinafter, some exemplary embodiments according to the present disclosure will be described in detail by referring to the drawings. It should be noted that the embodiments described below are examples of implementations of the present invention and may be suitably revised or changed according to a configuration and various conditions of an apparatus to which the present invention is applied. Moreover, embodiments can be combined suitably.

FIG. 1 is a block diagram schematically showing a configuration of a digital camera 100 as an external apparatus that communicates with a communication apparatus according to one embodiment of the present disclosure. As shown in FIG. 1, the digital camera 100 is provided with a controller 101, an image pickup unit 102, a nonvolatile memory 103, a work memory 104, an operation unit 105, a recording medium 106, a communication unit 107, and a near-field communication unit 108. The controller 101 is connected with the image pickup unit 102, nonvolatile memory 103, work memory 104, operation unit 105, recording medium 106, communication unit 107, and near-field communication unit 108. Although the digital camera 100, which is an image pickup apparatus, is described as an example of an external apparatus that communicates with a smart device 200 of FIG. 2 mentioned later in this embodiment, the external apparatus is not restricted to the digital camera. For example, the external apparatus may be an information processing apparatus, such as a portable media player, a tablet device, or a personal computer.

The controller 101 runs a program stored in the nonvolatile memory 103 according to a received signal to control components of the digital camera 100. It should be noted that a plurality of hardware units may share the process to control the entire digital camera 100 instead of the controller 101.

The image pickup unit 102 includes an optical lens unit, a drive system that controls aperture, zoom, and focus, etc., and an image sensor that converts an object image formed by the optical lens unit into an electric video signal. The image sensor is a CMOS (Complementary Metal Oxide Semiconductor) or a CCD (Charge Coupled Device), for example. The image pickup unit 102 is controlled by the controller 101 and converts an object image into an electrical signal with the image sensor. The image pickup unit 102 applies a noise reduction process etc. to digital data obtained from the electrical signal concerned and outputs processed digital data as image data. In the digital camera 100, the controller 101 applies a coding process to the above-mentioned image data and records the processed image data into the recording medium 106 as a file according to the standard specification of the DCF (Design rule for Camera File system).

The nonvolatile memory 103 is able to erase and record data electrically. The nonvolatile memory 103 stores various programs that the controller 101 runs. The work memory 104 is used as a buffer memory that temporarily stores image data that the image pickup unit 102 captures and a workspace of the controller 101.

The operation unit 105 is used when a user inputs an instruction. The operation unit 105 includes a power button for instructing ON/OFF of a power source of the digital camera 100, a release switch for instructing an image pickup, and a reproduction button for instructing reproduction of the image data. The operation unit 105 further includes an operating member like a connection button for exclusive use for starting communication with the communication apparatus through the communication unit 107. It should be noted that the release switch has a SW1 and a SW2 in order to detect a pressed state in two steps. When the release switch is in what is called a half-pressed state, the SW1 turns ON. When the SW1 turns ON, the digital camera 100 receives it as instructions for image pickup preparations, such as an AF (Auto Focus) process, an AE (Automatic Exposure) process, an AWB (Auto White Balance) process, and an EF (flash pre-emission) process. Moreover, when the release switch is in what is called a full press state, the SW2 turns ON. When the SW2 turns ON, the digital camera 100 receives it as an instruction of image pickup.

The recording medium 106 records image data output from the image pickup unit 102. It should be noted that the recording medium 106 may be detachably attached to the digital camera 100 or may be built in the digital camera 100. Namely, the digital camera 100 should be provided with a means to access the recording medium 106 in the embodiment. The communication unit 107 is an interface for communicating with the communication apparatus. The digital camera 100 of the embodiment performs data transmission/reception with the communication apparatus through the communication unit 107. For example, the digital camera 100 transmits image data generated by the image pickup unit 102 to the smart device 200 through the communication unit 107. It should be noted that the communication unit 107 in this embodiment includes an interface that performs wireless communication (hereinafter referred to as "wireless LAN communication") in accordance with the standard of IEEE802.11 with the communication apparatus.

The near-field communication unit 108 consists of an antenna used for near-field wireless communication, a modulation/demodulation circuit for processing a wireless signal, and a communication controller. The near-field communication unit 108 outputs a modulated signal from the antenna and achieves the near-field wireless communication (hereinafter referred to as "Bluetooth communication") in accordance with the standard of IEEE802.15 (what is called Bluetooth) by demodulating a wireless signal received with the antenna. In the embodiment, Bluetooth Ver. 4 (Bluetooth Low Energy) that achieves low power consumption is employed in the Bluetooth communication. A communicable range of the Bluetooth communication is narrower than that of the wireless LAN communication, i.e., a communicable distance is shorter. Moreover, a communication speed of the Bluetooth communication is lower than that of the wireless LAN communication. In the meantime, power consumption of the Bluetooth communication is lower than that of the wireless LAN communication. The digital camera 100 of the embodiment performs data transmission/reception with the communication apparatus through the near-field communication unit 108. For example, when the near-field communication unit 108 receives an image pickup instruction from the communication apparatus by the Bluetooth communication, the digital camera 100 controls the image pickup unit 102 to perform an image pickup operation. Moreover, when the near-field communication unit 108 receives an instruction for performing data transmission/reception using the wireless LAN communication from the communication apparatus by the Bluetooth communication, the digital camera 100 controls the communication unit 107 to start the wireless LAN communication.

In the embodiment, the digital camera 100 starts the wireless LAN communication with the smart device 200 of FIG. 2 mentioned later through the communication unit 107 and is communicatively connected. Moreover, in the embodiment, the communication unit 107 is provided with an access point (hereinafter referred to as "AP") mode and a client (hereinafter referred to as "CL") mode as an operation mode. The operation mode of the communication unit 107 is set up, for example, when a user operates the operation unit 105. When the CL mode is set as the operation mode of the communication unit 107, the digital camera 100 operates as a CL apparatus in an infrastructure mode and becomes able to participate in a network formed by a peripheral AP apparatus by communicatively connecting to the AP apparatus. In the meantime, when the AP mode is set as the operation mode of the communication unit 107, the digital camera 100 operates as an AP apparatus in the infrastructure mode. Although the digital camera 100 is a kind of the AP, it operates as a simple AP (hereinafter referred to as a "simplified AP") of which functions are limited. The digital camera 100 that operates as the simplified AP forms a network by itself. A peripheral apparatus of the digital camera 100 recognizes the digital camera 100 as an AP apparatus and participates in the network formed by the digital camera 100. It should be noted that the digital camera 100 that operates as simplified AP is not provided with a gateway function that transfers data received from a CL apparatus to an internet provider etc. in the embodiment. Accordingly, when the digital camera 100 operates as the simplified AP, even when receiving data from the CL apparatus that participates in the network formed by the digital camera 100, the digital camera 100 cannot transfer the received data to another network, such as the Internet. The program for operating the digital camera 100 is stored in the nonvolatile memory 103, as mentioned above.

Figure 2:
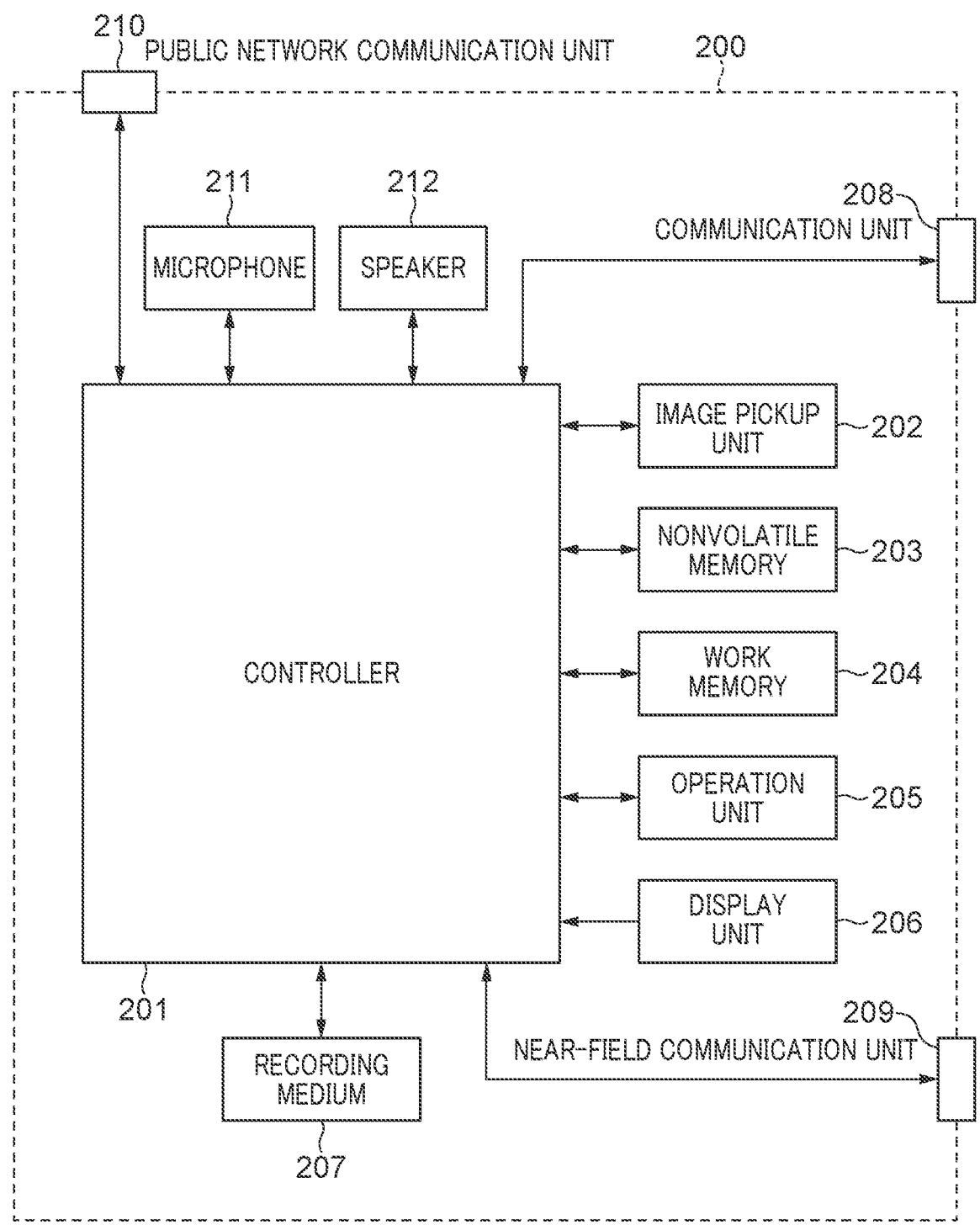
FIG. 2 is a block diagram schematically showing a configuration of a smart device as the communication apparatus according to the present embodiment.

FIG. 2 is a block diagram schematically showing a configuration of the smart device 200 as the communication apparatus according to one of the present disclosure. As shown in FIG. 2, the smart device 200 is provided with a controller 201, an image pickup unit 202, a nonvolatile memory 203, a work memory 204, an operation unit 205, a display unit 206, a recording medium 207, a communication unit 208, a near-field communication unit 209, a public network communication unit 210, a microphone 211, and a speaker 212. The controller 201 is connected with the image pickup unit 202, nonvolatile memory 203, work memory 204, operation unit 205, display unit 206, recording medium 207, communication unit 208, near-field communication unit 209, public network communication unit 210, microphone 211, and speaker 212. Although the smart device is described as an example of the communication apparatus in the embodiment, the communication apparatus is not restricted to this. For example, the communication apparatus may be information processing apparatuses equipped with wireless communication function, such as a digital camera, printer, television, and personal computer.

The smart device 200 is a mobile terminal, such as a smart phone or a tablet device. The controller 201 controls each component of the smart device 200 according to a received signal and a program that is stored in the nonvolatile memory 203. It should be noted that a plurality of hardware units may share the process to control the entire smart device 200 instead of the controller 201.

The image pickup unit 202 converts an object image formed by a lens (not shown) included in the image pickup unit 202 into an electrical signal. The image pickup unit 202 applies a noise reduction process etc. to digital data obtained from the electrical signal concerned and outputs processed digital data as image data. The image data is stored in a buffer memory (not shown). The controller 201 applies predetermined calculation and a coding process to the image data stored in the buffer memory and records the processed image data as a file into the recording medium 207. The nonvolatile memory 203 is able to erase and record data electrically. The nonvolatile memory 203 stores an OS (Operating System) that is fundamental software executed by the controller 201 and an application that cooperates with the OS to achieve an applied function. For example, the nonvolatile memory 203 stores a communication application to communicate with the digital camera 100.

The work memory 204 is used as an image display memory of the display unit 206, a workspace of the controller 201, etc. The operation unit 205 is used when a user inputs an instruction. The operation unit 205 includes operation members, such as a power button that a user instructs ON/OFF of the power source of the smart device 200, and a touch panel provided in the display unit 206, for example. The display unit 206 displays image data, characters for an interactive operation, etc. In the smart device 200, the operation unit 205 and the display unit 206 function as a user interface of the smart device 200. It should be noted that the smart device 200 may not include the display unit 206. In such a case, the smart device 200 should be connectable to an external display device and should have a display control function that controls display contents on the external display device. The recording medium 207 records image data output from the image pickup unit 202. It should be noted that the recording medium 207 may be detachably attached to the smart device 200 or may be built in the smart device 200. Namely, the smart device 200 should be provided with a means to access the recording medium 207.

The communication unit 208 is an interface for communicating with an external apparatus, and in particular, is an antenna for performing the wireless LAN communication. The communication unit 208 performs data transmission/reception with the digital camera 100. The communication unit 208 performs the wireless LAN communication with the digital camera 100 directly or through an AP. The communication unit 208 uses HTTP (Hyper Text Transfer Protocol) or PTP/IP (Picture Transfer Protocol over Internet Protocol) through the wireless LAN as a protocol for communication, for example. It should be noted that the communication with the digital camera 100 by the communication unit 208 is not restricted to this. For example, the communication unit 208 may perform cable communication with an external apparatus connected through a USB cable or an HDMI cable according to a communication standard, such as IEEE1394 or the Ethernet. Moreover, the communication unit 208 may include a wireless communication module, such as an infrared ray communication module, a Bluetooth (registered trademark) communication module, or a WirelessUSB.

The near-field communication unit 209 is a communication unit for achieving the near-field wireless communication. The near-field communication unit 209 consists of an antenna used for near-field wireless communication, a modulation/demodulation circuit for processing a wireless signal, and a communication controller. The near-field communication unit 209 performs the near-field wireless communication by outputting a modulated wireless signal from the antenna and by demodulating a wireless signal received with the antenna. The near-field communication unit 209 achieves the Bluetooth communication, for example.

The public network communication unit 210 is an interface used when performing public wireless communication. The smart device 200 performs a call process with another device through the public network communication unit 210. At this time, the controller 201 achieves a telephone call by inputting and outputting audio signals through the microphone 211 and the speaker 212. In the embodiment, the public network communication unit 210 is an antenna. The controller 201 is connectable to a public network through the public network communication unit 210. It should be noted that one antenna may be shared by the functions of the communication unit 208 and the public network communication unit 210 in the embodiment.

In the embodiment, the digital camera 100 operates as the simplified AP when a user gives the digital camera 100 a simplified-AP start operation that is an instruction to start the digital camera 100 as the simplified AP. The smart device 200 participates in the network formed by the digital camera 100 operating as the simplified AP and establishes the wireless LAN communication with the digital camera 100. When the smart device 200 establishes the wireless LAN communication with the digital camera 100, the user is able to perform various instructions to the digital camera by operating the smart device 200. For example, the user can change simplified-AP communication parameters stored in the digital camera 100 by operating the smart device 200. The simplified-AP communication parameters are communication parameters needed for operating the digital camera 100 as the simplified AP, and are needed for the wireless LAN communication of the network formed by the digital camera 100. For example, the simplified-AP communication parameters include an SSID (Service Set Identifier) of the digital camera 100 started as the simplified AP, a password, and a channel.

Figure 3:
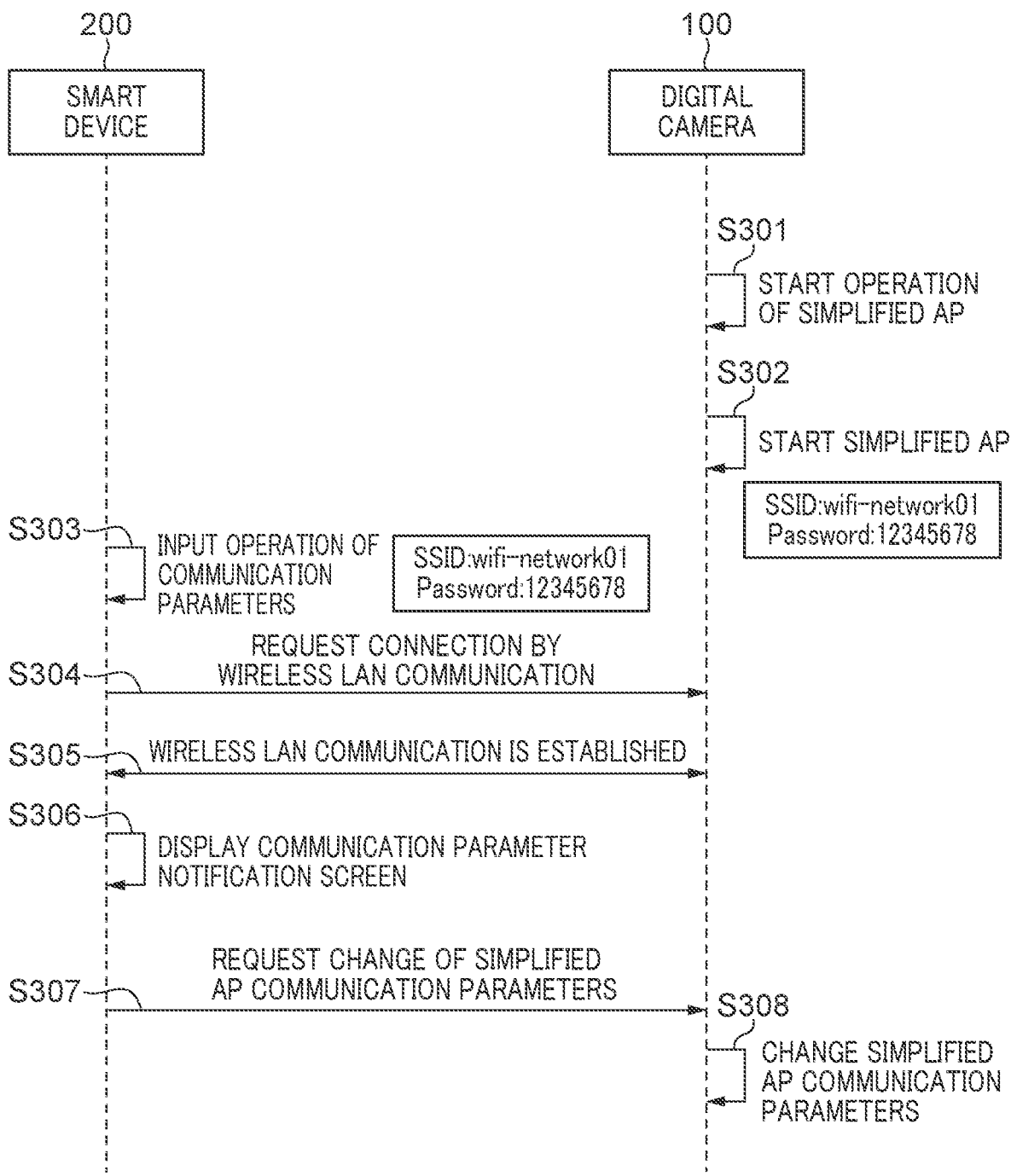
FIG. 3 is a sequence chart for describing a series of procedures of a process that is performed following a user's simplified-AP start operation until changing a simplified-AP communication parameter according to one embodiment.

FIG. 3 is a sequence chart for describing a series of procedures of a process that is performed following a user's simplified-AP start operation until changing the simplified-AP communication parameters. It should be noted that the SSID included in the simplified-AP communication parameters shall be beforehand set to "wifi-network01" and the password shall be beforehand set to "12345678" as shown in FIG. 3, for example.

As shown in FIG. 3, the controller 101 of the digital camera 100 detects that the simplified-AP start operation is received from the user in a step S301 first. In a step S302, the controller 101 of the digital camera 100 starts the digital camera 100 as the simplified AP using the simplified-AP communication parameters set up beforehand.

Figure 4A:
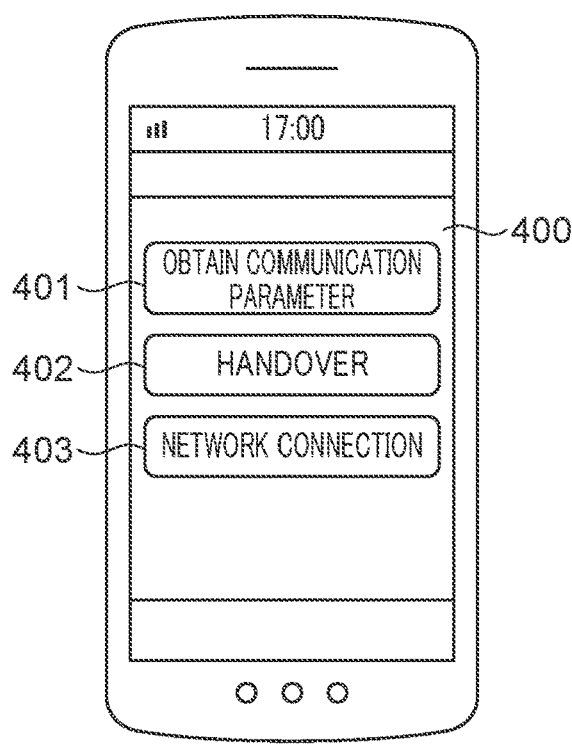
FIG. 4A through FIG. 4D are views showing examples of screens displayed on a display unit shown in FIG. 2 according to one embodiment.
Figure 4B:
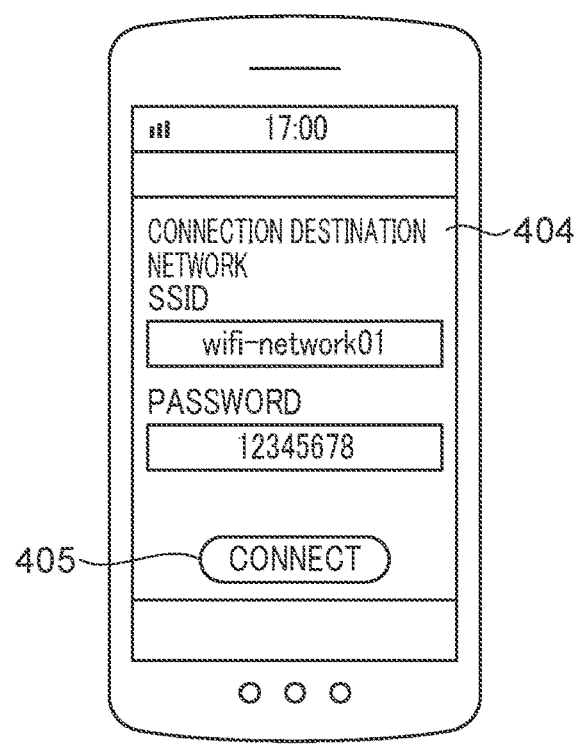

In the meantime, the controller 201 of the smart device 200 displays a selection screen 400 of FIG. 4A on the display unit 206 according to a user's instruction. The selection screen 400 includes a communication parameter obtainment button 401, a handover button (communication establishment designator) 402, and a network connection button 403. The communication parameter obtainment button 401 is used to request the simplified-AP communication parameters used by handover mentioned later from the digital camera 100. The handover button 402 is used when a user instructs to start the handover mentioned later. It should be noted that the handover button 402 is controlled so that a user cannot select it when the smart device 200 does not store the simplified-AP communication parameters. The network connection button 403 is used to instruct to display an input screen 404 of FIG. 4B. When a user selects the network connection button 403, the controller 201 of the smart device 200 displays the input screen 404 of FIG. 4B including input columns of the simplified-AP communication parameters on the display unit 206. It should be noted that the digital camera 100 does not have a display unit for notifying a user of the simplified-AP communication parameters in the embodiment.

Accordingly, the user reads the simplified-AP communication parameters that are printed on a label stuck on a bottom or side surface of the digital camera 100 like a general wireless LAN access point, and inputs the read parameters into input columns on the input screen 404.

In a step S303, the controller 201 of the smart device 200 detects that the user's input operation to the input screen 404 is received. As the input operation, the user inputs the SSID "wifi-network01" and the password "12345678", which are the simplified-AP communication parameters read from the above-mentioned label, into the input columns on the input screen 404, and also selects a connection button 405 on the input screen 404.

In a step S304, the controller 201 of the smart device 200 controls the communication unit 208 to request connection of the wireless LAN communication from an AP that is specified by the communication parameters input into the input columns on the input screen 404. When receiving the connection request of the wireless LAN communication from the smart device 200, the controller 101 of the digital camera 100 transmits a notification about an implementation propriety of the wireless LAN communication to the smart device 200.

Figure 4C:
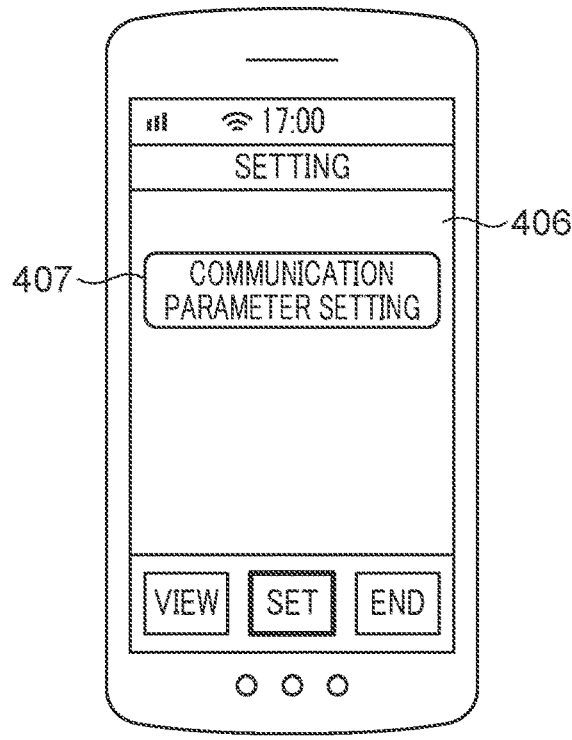
Figure 4D:
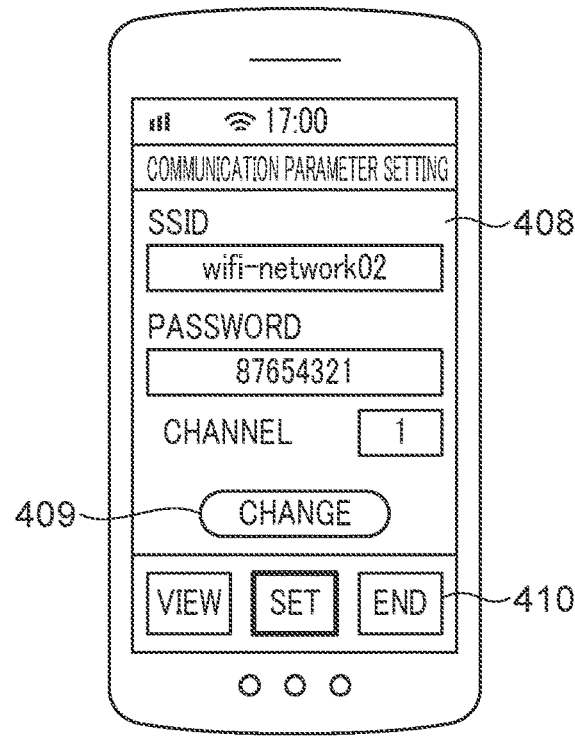

In a step S305, the controller 201 of the smart device 200 establishes the wireless LAN communication with the digital camera 100 on the basis of the contents of the notification received from the digital camera 100. Next, the controller 201 of the smart device 200 displays an operation screen 406 of FIG. 4C on the display unit 206. The operation screen 406 includes a communication parameter setting button 407. The communication parameter setting button 407 is used to instruct to display a communication parameter notification screen 408 of FIG. 4D. When the user selects the communication parameter setting button 407, the controller 201 of the smart device 200 obtains the simplified-AP communication parameters from the digital camera 100 by the wireless LAN communication and performs a process of a step S306.

In the step S306, the controller 201 of the smart device 200 displays a communication parameter notification screen 408 on the display unit 206. The communication parameter notification screen 408 is displayed in a state where the simplified-AP communication parameters obtained from the digital camera 100 are set to its input columns. The user can instruct a change request of the simplified-AP communication parameters by entering a new SSID and password into the input columns of the communication parameter notification screen 408 and selecting a change button (a change designator) 409 on the communication parameter notification screen 408.

When receiving the user's instruction of the change request of the communication parameters, the controller 201 of the smart device 200 transmits the change request of the communication parameters to the digital camera 100 by the wireless LAN communication in a step S307.

When receiving the change request of the communication parameters from the smart device 200, the controller 101 of the digital camera 100 changes the simplified-AP communication parameters to the values that are input into the input columns on the communication parameter notification screen 408 in a step S308. When the simplified-AP communication parameters are changed, the user sticks a new label on which the communication parameters after change are written on the bottom or side surface of the digital camera 100 and manages it.

Moreover, handover is used as another means to establish the wireless LAN communication between the digital camera 100 and smart device 200 in the embodiment. In the handover, the smart device 200 obtains the simplified-AP communication parameters from the digital camera 100 by the near-field wireless communication like the Bluetooth communication and establishes the wireless LAN communication with the digital camera 100 using the simplified-AP communication parameters. Thereby, even if the user does not perform the simplified-AP start operation to the digital camera 100, and the input operation on the input screen 404, the smart device 200 is able to establish the wireless LAN communication with the digital camera 100. Moreover, the user is able to change the simplified-AP communication parameters by operating the smart device 200 that has established the wireless LAN communication with the digital camera 100 by the handover. However, when a simplified-AP communication parameter is changed after establishing the wireless LAN communication by the handover, a defect that the wireless LAN communication cannot be established by the handover thereafter occurs.

Figure 5:
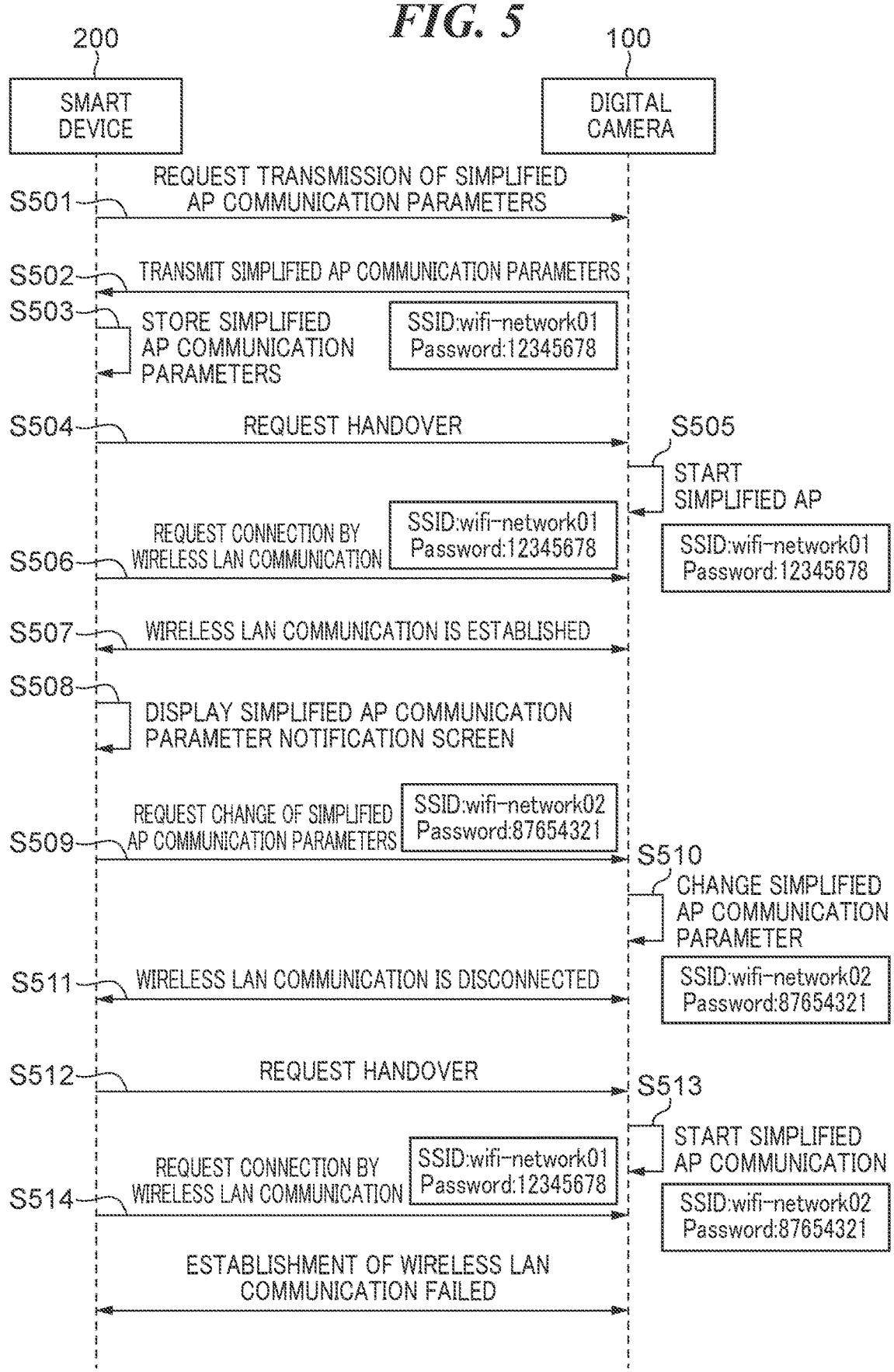
FIG. 5 is a sequence chart for describing a defect occurred when the simplified-AP communication parameters are changed after establishing wireless LAN communication by handover according to one embodiment.

FIG. 5 is a sequence chart for describing a defect occurred when the simplified-AP communication parameters are changed after establishing the wireless LAN communication by the handover. It should be noted that the process of FIG. 5 starts when the user selects the communication parameter obtainment button 401 on the selection screen 400 displayed on the display unit 206 of the smart device 200 in the embodiment.

In FIG. 5, the controller 201 of the smart device 200 requests transmission of the simplified-AP communication parameters from the digital camera 100 by the Bluetooth communication (communication through a first communication path) in a step S501 first.

When receiving the transmission request of the communication parameters from the smart device 200, the controller 101 of the digital camera 100 transmits the simplified-AP communication parameters to the smart device 200 by the Bluetooth communication in a step S502. For example, the controller 101 of the digital camera 100 transmits the simplified-AP communication parameters including the SSID "wifi-network01" and the password "12345678" to the smart device 200 by the Bluetooth communication.

When receiving the simplified-AP communication parameters, the controller 201 of the smart device 200 stores the simplified-AP communication parameters received into the nonvolatile memory 203 in a step S503. In the embodiment, the smart device 200 stores the simplified-AP communication parameters obtained from the digital camera 100 by the Bluetooth communication and will use the simplified-AP communication parameters concerned when establishing the wireless LAN communication with the digital camera 100 by the handover after next time.

Next, the controller 201 of the smart device 200 requests the handover from the digital camera 100 by the Bluetooth communication in a step S504.

When receiving the handover request from the smart device 200, the controller 101 of the digital camera 100 starts the digital camera 100 in a step S505 as the simplified AP corresponding to the simplified-AP communication parameters transmitted in the step S502.

In the next step S506, the controller 201 of the smart device 200 controls the near-field communication unit 209 to request connection by the wireless LAN communication from the AP corresponding to the simplified-AP communication parameters stored in the nonvolatile memory 203 in the step S503. When receiving the connection request of the wireless LAN communication from the smart device 200, the controller 101 of the digital camera 100 transmits a notification about an implementation propriety of the wireless LAN communication to the smart device 200.

In a step S507, the controller 201 of the smart device 200 establishes the wireless LAN communication (communication through a second communication path different from the first communication path) with the digital camera 100 on the basis of the contents of the notification received from the digital camera 100 (a communication establishment control unit). Thereby, the communication between the smart device 200 and digital camera 100 switches from the Bluetooth communication to the wireless LAN communication.

In a step S508, the controller 201 of the smart device 200 displays a communication parameter notification screen 408 on the display unit 206 according to a user's designation. When receiving the user's instruction of the change request of the communication parameters on the communication parameter notification screen 408, the controller 201 of the smart device 200 transmits the change request of the simplified-AP communication parameters to the digital camera 100 by the wireless LAN communication (a communication parameter change control unit).

When receiving the change request of the communication parameters from the smart device 200, the controller 101 of the digital camera 100 changes the simplified-AP communication parameters to the values that are input into the input columns on the communication parameter notification screen 408 in a step S510. For example, the controller 101 of the digital camera 100 changes the SSID to "wifi-network02" and changes the password to "87654321". The communication parameters after change are stored in the recording medium 106. Next, the controller 101 of the digital camera 100 disconnects the communication connection (hereinafter referred to as a "wireless LAN connection") with the smart device 200 by the wireless LAN communication in a step S511. Although the digital camera 100 disconnects the wireless LAN connection with the smart device 200 in response to the change of the simplified-AP communication parameters in the embodiment, the present invention is not restricted to this. For example, the wireless LAN connection may be continued even after changing the simplified-AP communication parameters and may be disconnected according to a user's instruction.

Next, the controller 201 of the smart device 200 displays the selection screen 400 on the display unit 206 according to a user's instruction. When the user selects the handover button 402 on the selection screen 400, the controller 201 of the smart device 200 requests the handover from the digital camera 100 by the Bluetooth communication in a step S512.

When receiving the handover request from the smart device 200, the controller 101 of the digital camera 100 starts the digital camera 100 in a step S513 as the simplified AP corresponding to the simplified-AP communication parameters changed in the step S510. That is, the digital camera 100 starts as the simplified AP of which the SSID is "wifi-network02" and the password is "87654321".

In the meantime, in a step S514, the controller 201 of the smart device 200 requests connection by the wireless LAN communication from the AP corresponding to the simplified-AP communication parameters stored in the nonvolatile memory 203 in the step S503. At this time, the SSID and password of the simplified-AP communication parameters that are stored in the nonvolatile memory 203 are the values ("wifi-network01" and "12345678") before change and differ from the SSID "wifi-network02" and password "87654321" of the digital camera 100 started as the simplified AP. Accordingly, the smart device 200 cannot establish the wireless LAN connection with the digital camera 100. In this way, when the wireless LAN communication is established by the handover and the simplified-AP communication parameters are changed, the simplified-AP communication parameters stored in the digital camera 100 are inconsistent with the simplified-AP communication parameters stored by the smart device 200. As a result, the defect that the wireless LAN communication cannot be established by the handover occurs.

As compared with this, in the embodiment, when the smart device 200 establishes the wireless LAN communication with the digital camera 100 by switching from the Bluetooth communication by the handover, change of the simplified-AP communication parameters stored in the digital camera 100 is prohibited.

Figure 6:
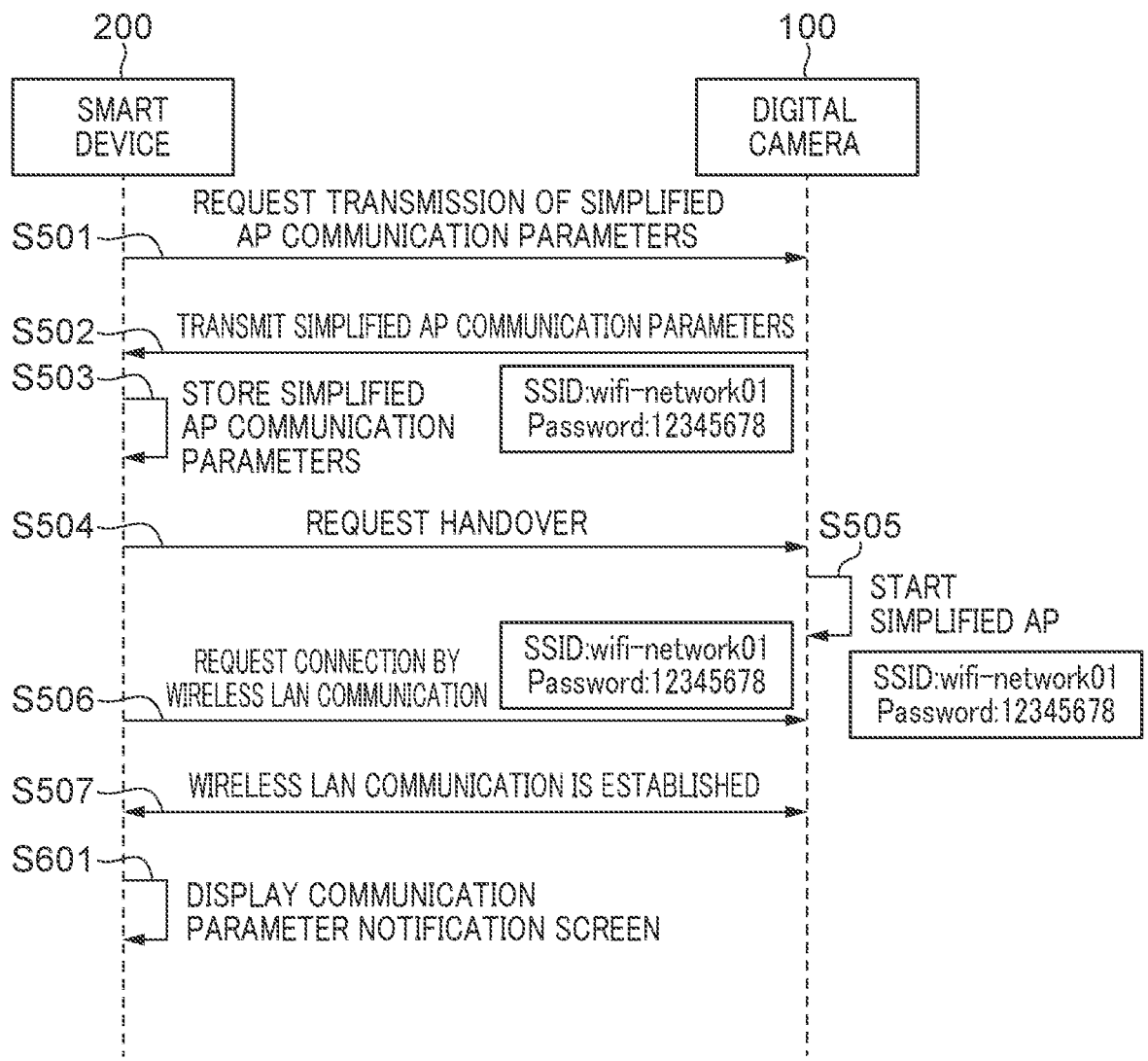
FIG. 6 is a sequence chart for describing a process that prohibits change of the simplified-AP communication parameters according to one embodiment.

FIG. 6 is a sequence chart for describing a process that prohibits change of the simplified-AP communication parameters. It should be noted that the process of FIG. 6 starts when the user selects the communication parameter obtainment button 401 on the selection screen 400 displayed on the display unit 206 of the smart device 200 in the embodiment.

As shown in FIG. 6, the digital camera 100 and the smart device 200 perform the same process in the steps S501 through S507 mentioned above and establish the wireless LAN communication by the handover.

Figure 7:
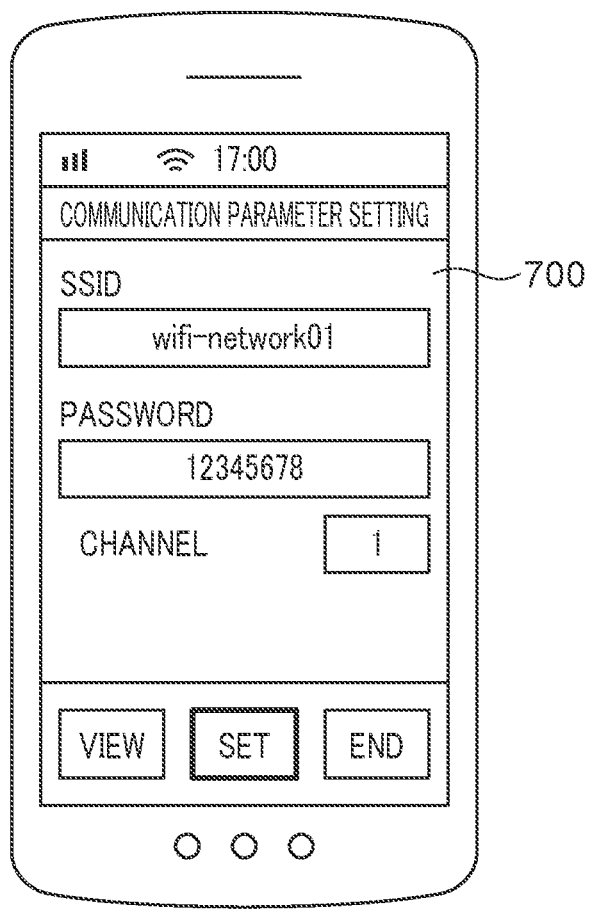
FIG. 7 is a view showing an example of a communication parameter notification screen displayed on the display unit shown in FIG. 2 according to one embodiment.

After establishing the wireless LAN communication with the digital camera 100, the controller 201 of the smart device 200 displays a communication parameter notification screen 700 of FIG. 7 on the display unit 206 in a step S601 according to a user's instruction. The simplified-AP communication parameters obtained from the digital camera 100 are set to input columns of the communication parameter notification screen 700 as with the communication parameter notification screen 408. However, unlike the communication parameter notification screen 408, the communication parameter notification screen 700 does not include the change button for instructing the change request of the simplified-AP communication parameters. Thus, when the wireless LAN communication is established by the handover, the smart device 200 is controlled so that a user cannot instruct the change request of the simplified-AP communication parameters in the embodiment.

Figure 8:
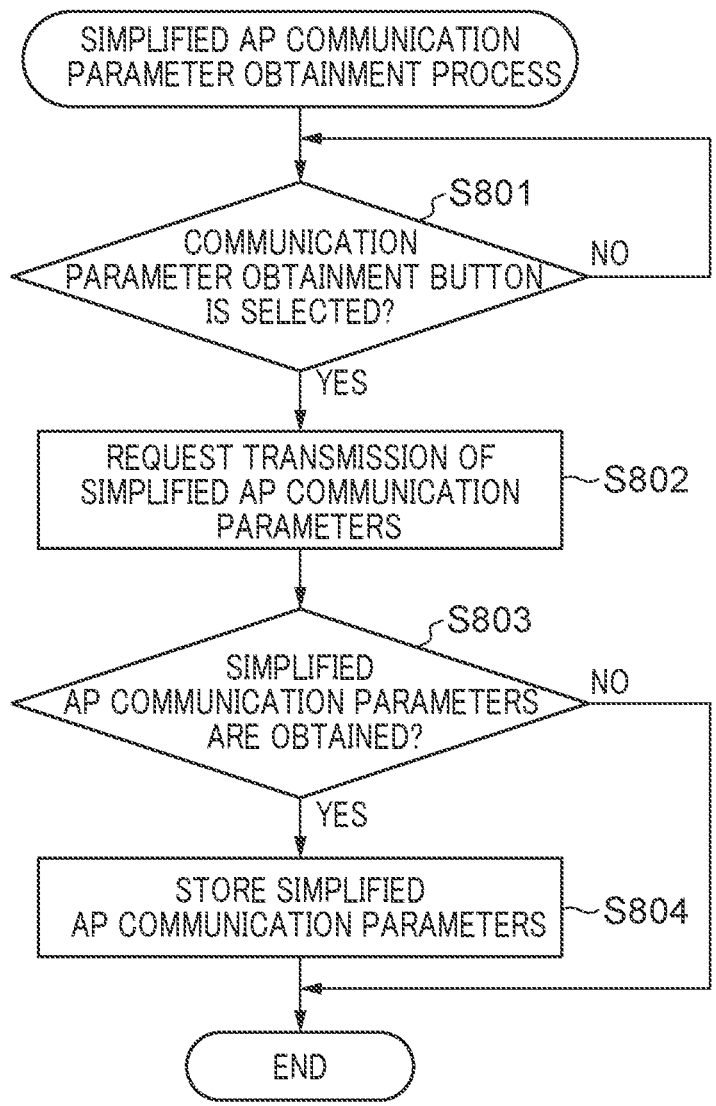
FIG. 8 is a flowchart showing procedures of a simplified-AP communication parameter obtainment process executed by the smart device of FIG. 2 according to one embodiment.

FIG. 8 is a flowchart showing procedures of a simplified-AP communication parameter obtainment process executed by the smart device 200 of FIG. 2. The process of FIG. 8 is achieved when the controller 201 executes a program stored in the nonvolatile memory 203. Moreover, the process of FIG. 8 is executed when the selection screen 400 is displayed on the display unit 206.

As shown in FIG. 8, in a step S801, the controller 201 determines whether the user selects the communication parameter obtainment button 401 on the selection screen 400. The controller 201 waits until the user selects the communication parameter obtainment button 401 on the selection screen 400. When the controller 201 determines that the user selects the communication parameter obtainment button 401 on the selection screen 400 in the step S801, the process proceeds to a step S802.

In the step S802, the controller 201 requests transmission of the simplified-AP communication parameters from the digital camera 100 by the Bluetooth communication.

In a step S803, the controller 201 determines whether the near-field communication unit 209 obtains the simplified-AP communication parameters from the digital camera 100. When the controller 201 determines that the near-field communication unit 209 obtains the simplified-AP communication parameters from the digital camera 100 in the step S803, the process proceeds to a step S804. In the meantime, when the controller 201 determines that the near-field communication unit 209 does not obtain the simplified-AP communication parameters from the digital camera 100, the process is finished. For example, when the communication by the near-field communication unit 209 is disconnected or when a response from the digital camera 100 is not received within a definite period, the controller 201 determines that the near-field communication unit 209 does not obtain the simplified-AP communication parameters from the digital camera 100.

In the step S804, the controller 201 stores the simplified-AP communication parameters obtained from the digital camera 100 into the nonvolatile memory 203. Then, the controller 201 finishes this process. It should be noted that a stored area of the simplified-AP communication parameters is not restricted to the nonvolatile memory 203. The parameters may be stored in the recording medium 207 or in another apparatus connected through the public network communication unit 210.

Figure 9:
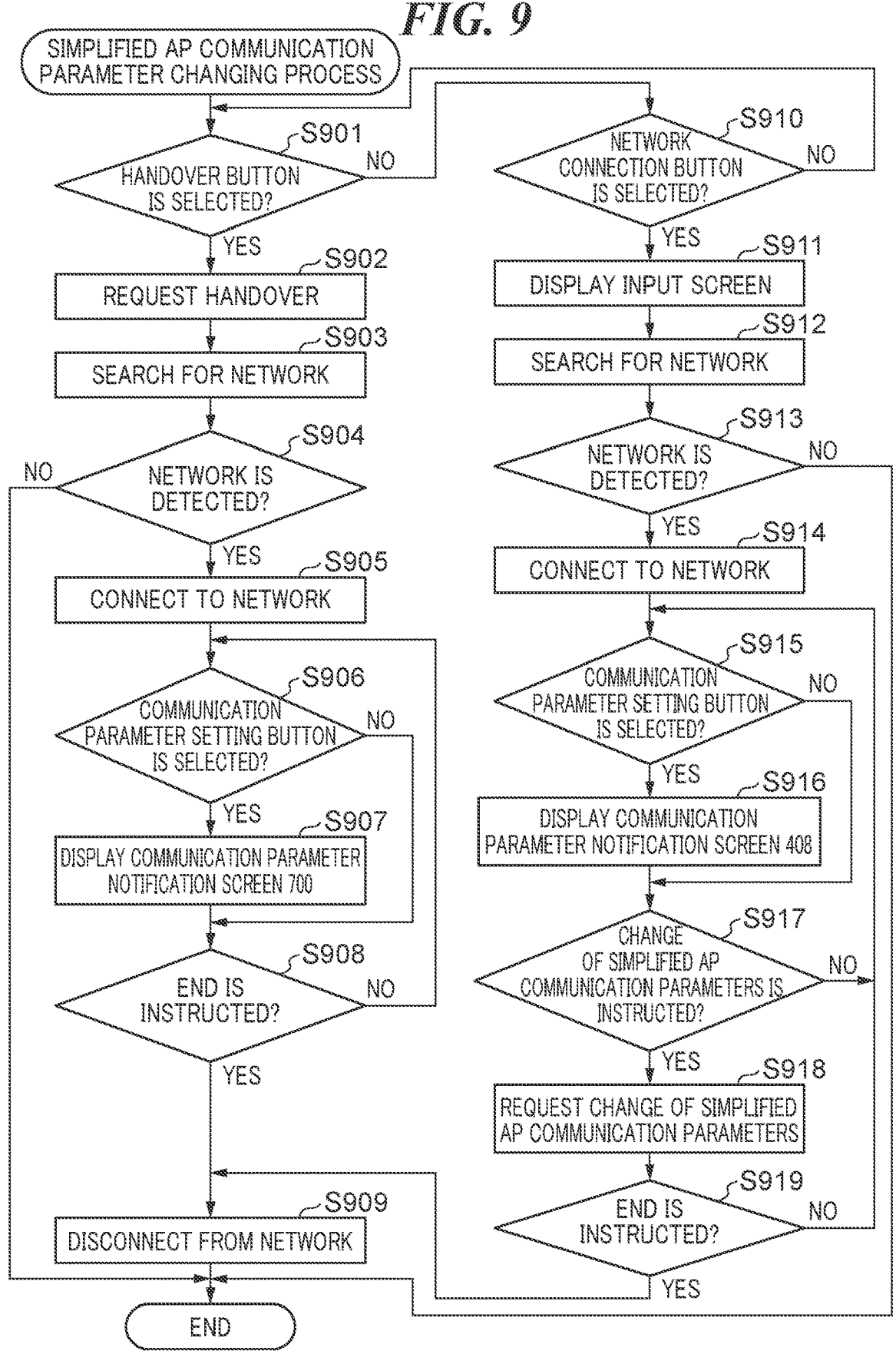
FIG. 9 is a flowchart showing procedures of a simplified-AP communication parameter change process executed by the smart device of FIG. 2 according to one embodiment.

FIG. 9 is a flowchart showing procedures of a simplified-AP communication parameter change process executed by the smart device 200 of FIG. 2. The process of FIG. 9 is achieved when the controller 201 executes a program stored in the nonvolatile memory 203 as with the process of FIG. 8. Moreover, the process of FIG. 9 is executed when the selection screen 400 is displayed on the display unit 206.

As shown in FIG. 9, in a step S901, the controller 201 determines whether the user selects the handover button 402 on the selection screen 400.

In the step S901, when the controller 201 determines that the user selects the handover button 402 on the selection screen 400, the process proceeds to a step S902 and a process of the wireless LAN connection by the handover is performed. In the meantime, when the controller 201 determines that the user does not select the handover button 402 on the selection screen 400 in the step S901, the process proceeds to a step S910.

In the step S902, the controller 201 requests the handover from the digital camera 100 by the Bluetooth communication. When receiving the handover request, the digital camera 100 is started as the simplified AP (see the step S504, for example).

In a step S903, the controller 201 searches for the network corresponding to the simplified-AP communication parameters stored in the nonvolatile memory 203 in the step S804. This network is constructed with the simplified AP function of the digital camera 100.

In a step S904, the controller 201 determines whether the communication unit 208 detects the above-mentioned network.

When the controller 201 determines that the communication unit 208 detects the above-mentioned network in the step S904, the process proceeds to a step S905. In the meantime, when the controller 201 determines that the communication unit 208 does not detect the above-mentioned network, the process is finished. For example, when the communication by the communication unit 208 is disconnected or when the above-mentioned network cannot be detected within a definite period, the controller 201 determines that the communication unit 209 does not detect the above-mentioned network.

In the step S905, the controller 201 controls the communication unit 208 to connect with the above-mentioned network. When connecting with the above-mentioned network, the controller 201 displays the operation screen 406 on the display unit 206.

In a step S906, the controller 201 determines whether the user selects the communication parameter setting button 407 on the operation screen 406. When the controller 201 determines that the user selects the communication parameter setting button 407 on the operation screen 406 in the step S906, the process proceeds to a step S907. In the meantime, when the controller 201 determines that the user does not selects the communication parameter setting button 407 on the operation screen 406 in the step S906, the process proceeds to a step S908.

In the step S907, the controller 201 displays the communication parameter notification screen 700 on the display unit 206. As mentioned above, the communication parameter notification screen 700 does not include the change button for instructing the change request of the simplified-AP communication parameters. The communication parameter notification screen 700 is displayed in a state where the simplified-AP communication parameters just previously obtained from the digital camera 100 are set to its input columns. When the simplified-AP communication parameter obtainment process of FIG. 8 has been already executed before executing the simplified-AP communication parameter change process, the communication parameter notification screen 700 may be displayed in the state where the simplified-AP communication parameters stored in the nonvolatile memory 203 in the step S804 are set to its input columns.

In the step S908, the controller 201 determines whether end of the wireless LAN communication is instructed. For example, when the user selects an end button on the communication parameter notification screen 700 or when an OFF operation of the power button of the smart device 200 is performed, the controller 201 determines that the end of the wireless LAN communication is instructed. In the meantime, when neither of the operations mentioned above is performed, the controller 201 determines that the end of the wireless LAN communication is not instructed.

In the step S908, when the controller 201 determines that the end of the wireless LAN communication is not instructed, the process returns to the step S906. In the meantime, when the controller 201 determines that the end of the wireless LAN communication is instructed in the step S908, the process proceeds to a step S909.

In the step S909, the controller 201 disconnects the connection with the network that is connected through the communication unit 208. Then, this process is finished.

In a step S910, the controller 201 determines whether the user selects the network connection button 403 on the selection screen 400.

When the controller 201 determines that the user does not select the network connection button 403 on the selection screen 400 in the step S910, the process returns to the step S901. In the meantime, when the controller 201 determines that the user selects the network connection button 403 on the selection screen 400 in the step S910, the process proceeds to a step S911 and a process of the wireless LAN connection accompanied by the simplified-AP start operation is performed. It should be noted that the user performs the simplified-AP start operation to the digital camera 100 in parallel to the step S911 to start the digital camera 100 as the simplified AP, and the digital camera 100 constructs the above-mentioned network.

In the step S911, the controller 201 displays the input screen 404 on the display unit 206. When the user inputs the simplified-AP communication parameters to the input columns on the input screen 404 and selects the connection button 405, the controller 201 controls the communication unit 208 in the step S912 to search for the network corresponding to the simplified-AP communication parameters input.

In a step S913, the controller 201 determines whether the communication unit 208 detects the above-mentioned network. When the controller 201 determines that the communication unit 208 detects the above-mentioned network in the step S913, the process proceeds to a step S914. In the meantime, when the controller 201 determines that the communication unit 208 does not detect the above-mentioned network in the step S913, the process is finished. For example, when the communication by the communication unit 208 is disconnected or when the above-mentioned network cannot be detected within a definite period, the controller 201 determines that the communication unit 209 does not detect the above-mentioned network.

In the step S914, the controller 201 controls the communication unit 208 to connect with the above-mentioned network. When connecting with the above-mentioned network, the controller 201 displays the operation screen 406 on the display unit 206.

In a step S915, the controller 201 determines whether the user selects the communication parameter setting button 407 on the operation screen 406. When the controller 201 determines that the user selects the communication parameter setting button 407 on the operation screen 407 in the step S915, the process proceeds to a step S916. In the meantime, when the controller 201 determines that the user does not select the communication parameter setting button 407 on the operation screen 406 in the step S915, the process proceeds to a step S917.

In the step S916, the controller 201 displays the communication parameter notification screen 408 including the change button 409 for instructing the change request of the simplified-AP communication parameters on the display unit 206. In this way, in the embodiment, when the wireless LAN communication is established accompanied by the simplified-AP start operation, the change of the simplified-AP communication parameters stored in the digital camera 100 is permitted. It should be noted that the communication parameter notification screen 408 is displayed in the state where the simplified-AP communication parameters just previously obtained from the digital camera 100 are set to its input columns.

In the step S917, the controller 201 determines whether the change of the wireless LAN communication parameters is instructed. When the input operation of the change instruction is performed, for example, when the user inputs another value into the input column on the communication parameter notification screen 408 and selects the change button 409, the controller 201 determines that the change of the simplified-AP communication parameters is instructed. In this case, the process proceeds to a step S918. In the meantime, when the input operation of the change instruction is not performed, the controller 201 determines that the change of the simplified-AP communication parameters is not instructed. In this case, the process returns to the step S915.

In the step S918, the controller 201 transmits the change request of the simplified-AP communication parameters to the digital camera 100 by the wireless LAN communication. When receiving the change request concerned, the digital camera 100 changes the simplified-AP communication parameters to the values that are input through the communication parameter notification screen 408.

In a step S919, the controller 201 determines whether the end of the wireless LAN communication is instructed. For example, when the user selects the end button on the communication parameter notification screen 700 or when an OFF operation of the power button of the smart device 200 is performed, the controller 201 determines that the end of the wireless LAN communication is instructed. In this case, the process proceeds to a step S909. In the meantime, when neither of the operations mentioned above is performed, the controller 201 determines that the end of the wireless LAN communication is not instructed. In this case, the process returns to the step S915.

According to the above-mentioned embodiment, when the smart device 200 establishes the wireless LAN communication with the digital camera 100 by the handover, change of the simplified-AP communication parameters stored in the digital camera 100 is prohibited. This prevents an inconsistency between the simplified-AP communication parameters stored in the digital camera 100 and the simplified-AP communication parameters stored by the smart device 200 when the wireless LAN communication is established by the handover and the simplified-AP communication parameters are changed. As a result, the situation where the wireless LAN communication cannot be established by the handover is avoidable.

According to the above-mentioned embodiment, when the smart device 200 establishes the wireless LAN communication with the digital camera 100 accompanied by the simplified-AP start operation, the change of the simplified-AP communication parameters stored in the digital camera 100 is permitted. When the wireless LAN communication is established accompanied by the simplified-AP start operation, the simplified-AP communication parameters input by the user on the input screen 404 are used instead of the simplified-AP communication parameters stored in the smart device 200. Since the simplified-AP communication parameters that are inconsistent with the simplified-AP communication parameters stored in the digital camera 100 are not used when the wireless LAN communication is established, the establishment of the wireless LAN communication is not obstructed. In this way, if the change of the simplified-AP communication parameters stored in the digital camera 100 by operating the smart device 200 is not permitted even when the establishment of the wireless LAN communication is not obstructed, user's operability will be worse. Against this, according to the embodiment, when the smart device 200 establishes the wireless LAN communication with the digital camera 100 accompanied by the simplified-AP start operation, the change of the simplified-AP communication parameters stored in the digital camera 100 is permitted. This avoids a situation where the wireless LAN communication cannot be established by the handover and prevents the user's operability from getting bad more than needed.

According to the above-mentioned embodiment, when the smart device 200 establishes the wireless LAN communication with the digital camera 100 by the handover, the change button 409 is controlled so as not to be operated by a user. This prevents a user's instruction that causes an inconsistency between the simplified-AP communication parameters stored in the smart device 200 and the simplified-AP communication parameters stored in the digital camera 100.

Moreover, according to the above-mentioned embodiment, when the smart device 200 establishes the wireless LAN communication with the digital camera 100 by the handover, the change button 409 is not displayed on the display unit 206. This certainly prevents a user's instruction that causes an inconsistency between the simplified-AP communication parameters stored in the smart device 200 and the simplified-AP communication parameters stored in the digital camera 100.

In the above-mentioned embodiment, the digital camera 100 is an image pickup apparatus that is not provided with a display unit that displays the simplified-AP communication parameters. That is, the simplified-AP communication parameters of the image pickup apparatus, which approximately cannot change the simplified-AP communication parameters by its own operation unit, can be changed while avoiding the situation where the wireless LAN communication cannot be established by the handover.

In the above-mentioned embodiment, the smart device 200 stores the simplified-AP communication parameters obtained from the digital camera 100 by the Bluetooth communication. As a method that prevents an inconsistency between the simplified-AP communication parameters that are stored in the smart device 200 and the simplified-AP communication parameters that are stored in the digital camera 100, a configuration where the smart device 200 does not store the simplified-AP communication parameters can be considered. For example, exclusive hardware that issues a password is provided to the digital camera 100, and the digital camera 100 transmits the simplified-AP communication parameters including a different password in response to a handover request to the smart device 200 by the Bluetooth communication. However, such a configuration needs to provide the exclusive hardware to the digital camera 100. Moreover, since a frequency of transmissions and receptions of the simplified-AP communication parameters by Bluetooth communication increases, a leakage risk of the simplified-AP communication parameters in a case where the communication path using the near-field communication unit 209 of the smart device 200 is not encrypted increases. Against this, in the above-mentioned embodiment, the smart device 200 stores the simplified-AP communication parameters obtained from the digital camera 100 by the Bluetooth communication. Thereby, it is unnecessary to provide the exclusive hardware to the digital camera 100. Moreover, since the frequency of transmissions and receptions of the simplified-AP communication parameters by Bluetooth communication is reduced, the information leakage risk in the case where the communication path using the near-field communication unit 209 of the smart device 200 is not encrypted is reduced.

Although exemplary embodiments are been described above, the present invention is not limited to the embodiments described above. For example, in other embodiments, only the channel that does not affect the network connection among the simplified-AP communication parameters may be changeable.

In the above-described embodiments, the near-field wireless communication that the near-field communication unit 108 and the near-field communication unit 209 perform is not restricted to the Bluetooth communication but may be a near-field wireless communication according to another telecommunication standard.

The above-mentioned embodiments may be configured so that a user will select an apparatus to be connected from among a plurality of apparatuses of connection candidates in the step S902. For example, the smart device 200 may store a plurality of identifiers that uniquely distinguish the apparatuses of the connection candidates in the recording medium 207 and may display a list of the identifiers on the display unit 206 when executing the handover execution so that a user can select one of them.

In the above-mentioned embodiment, the smart device 200 may notify a user of an error when receiving an instruction to change the simplified-AP communication parameters stored in the digital camera 100 from a user after establishing the wireless LAN communication by the handover. For example, the smart device 200 may display an error message on the display unit 206. Thereby, a user can be notified that the accepted instruction may cause a defect.

Moreover, although the configuration where the change request of the simplified-AP communication parameters is not performed from the smart device 200 to the digital camera 100 when the wireless LAN communication is established by the handover is described in the above-mentioned embodiment, the present invention is not restricted to this. For example, when the smart device 200 establishes the wireless LAN communication with the digital camera 100 by the handover, the digital camera 100 may be configured not to change the simplified-AP communication parameters even if it receives the change request of the simplified-AP communication parameters from the smart device 200.

In the above-mentioned embodiment, when the smart device 200 establishes the wireless LAN communication with the digital camera 100 by the handover, the smart device 200 may delete the simplified-AP communication parameters stored according to the instruction of the change request of the simplified-AP communication parameters received from a user. That is, the handover button 402 is no longer displayed. This feature prevents the user from instructing establishment of the wireless LAN communication using the simplified-AP communication parameters that are stored without making changes and that are inconsistent with the simplified-AP communication parameters that are stored in the digital camera 100.

In the above-mentioned embodiment, the smart device 200 may update the simplified-AP communication parameters to the values that a user inputs in the input columns on the communication parameter notification screen 408 according to the change request of the simplified-AP communication parameters received from the user. This process prevents an inconsistency between the simplified-AP communication parameters stored in the digital camera 100 and the simplified-AP communication parameters stored by the smart device 200 when the wireless LAN communication is established by the handover and the simplified-AP communication parameters are changed. As a result, the situation where the wireless LAN communication cannot be established by the handover is avoided.

Although various embodiments have been described in detail on the basis of suitable embodiments, the present invention is not limited to these specific embodiments and includes various alternative configurations that do not deviate from the scope of the present invention. Parts of the above-mentioned embodiments may be combined suitably, for example.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-068606, filed Apr. 6, 2020, which is hereby incorporated by reference herein in its entirety.

What is claimed is:

1. A communication apparatus that communicates with an external apparatus through a first communication path, the communication apparatus comprising:
   a storage unit configured to store at least one communication parameter used for communicating with the external apparatus through a second communication path different from the first communication path;
   a communication establishment control unit configured to perform control to establish communication with the external apparatus through the second communication path using the at least one communication parameter stored in the storage unit; and
   a communication parameter change control unit configured to perform control to transmit to the external apparatus an instruction for a change of the at least one communication parameter stored in the external apparatus that establishes communication through the second communication path,
   wherein, in a case where the communication through the second communication path is established by switching from communication through the first communication path, the communication parameter change control unit restricts the change of the at least one communication parameter according to the instruction from the communication apparatus,
   wherein, in a case where the communication through the second communication path is established not by switching from communication through the first communication path, the communication parameter change control unit does not restrict the change of the at least one communication parameter according to the instruction from the communication apparatus, and
   wherein the storage unit, the communication establishment control unit, and communication parameter change control unit are implemented by one or more processor.

2. The communication apparatus according to claim 1, wherein the communication parameter change control unit permits change of the at least one communication parameter stored in the external apparatus that establishes communication through the second communication path in a case where communication with the external apparatus through the second communication path is established by a user's predetermined operation for establishing communication through the second communication path.

3. The communication apparatus according to claim 1, further comprising a change designator that a user uses to instruct change of the at least one communication parameter stored in the external apparatus,
   wherein the communication parameter change control unit controls the change designator so as to not allow the change designator to be operated by the user in the case where the communication through the second communication path is established by switching from communication through the first communication path.

4. The communication apparatus according to claim 3, further comprising a display unit,
   wherein the change designator is a button that may be displayed on the display unit, and
   wherein the communication parameter change control unit does not display the change designator in the case where the communication through the second communication path is established by switching from communication through the first communication path.

5. The communication apparatus according to claim 1, wherein an error is notified in a case where an instruction to change the at least one communication parameter stored in the external apparatus is received from the user after establishing the communication through the second communication path by switching from the communication through the first communication path.

6. The communication apparatus according to claim 1, further comprising a display unit,
   wherein a communication establishment designator, which is used by a user for instructing the communication apparatus to establish the communication through the second communication path by switching from the communication through the first communication path, is displayed on the display unit in a case where the storage unit stores the at least one communication parameter, and
   wherein the at least one communication parameter stored in the storage unit is deleted in a case where an instruction to change the at least one communication parameter stored in the external apparatus is received from the user after establishing the communication through the second communication path by switching from the communication through the first communication path.

7. The communication apparatus according to claim 1, wherein the at least one communication parameter includes an SSID and a password of the external apparatus used for the communication through the second communication path.

8. The communication apparatus according to claim 1, wherein the external apparatus is an image pickup apparatus that is not provided with a display unit that would display the at least one communication parameter.

9. A control method for a communication apparatus that communicates with an external apparatus through a first communication path and a second communication path that is different from the first communication path and that is provided with a storage unit that stores at least one communication parameter for communicating with the external apparatus through the second communication path, the control method comprising:
   a communication establishment control step of performing control to establish communication with the external apparatus through the second communication path using the at least one communication parameter stored in the storage unit; and
   a communication parameter change control step of performing control to transmit to the external apparatus an instruction for a change of the at least one communication parameter stored in the external apparatus that established communication through the second communication path,
   wherein, in a case where the communication through the second communication path is established by switching from communication through the first communication path, the change of the at least one communication parameter according to the instruction from the communication apparatus is restricted,
   wherein, in a case where the communication through the second communication path is established not by switching from communication through the first communication path, the communication parameter change control unit does not restrict the change of the at least one communication parameter according to the instruction from the communication apparatus, and wherein the storage unit, the communication establishment control unit, and communication parameter change control unit are implemented by one or more processor.

10. A non-transitory computer-readable storage medium storing a control program causing a computer to execute a control method for a communication apparatus that communicates with an external apparatus through a first communication path and a second communication path that is different from the first communication path and that is provided with a storage unit that stores at least one communication parameter for communicating with the external apparatus through the second communication path, the control method comprising:
- a communication establishment control step of performing control to establish communication with the external apparatus through the second communication path using the at least one communication parameter stored in the storage unit; and
- a communication parameter change control step of performing control to transmit to the external apparatus an instruction for a change of the at least one communication parameter stored in the external apparatus that established communication through the second communication path, wherein, in a case where the communication through the second communication path is established by switching from communication through the first communication path, the change of the at least one communication parameter according to the instruction from the communication apparatus is restricted, wherein, in a case where the communication through the second communication path is established not by switching from communication through the first communication path, the communication parameter change control unit does not restrict the change of the at least one communication parameter according to the instruction from the communication apparatus, and wherein the storage unit, the communication establishment control unit, and communication parameter change control unit are implemented by one or more processor.

* * * * *